Figure 1:
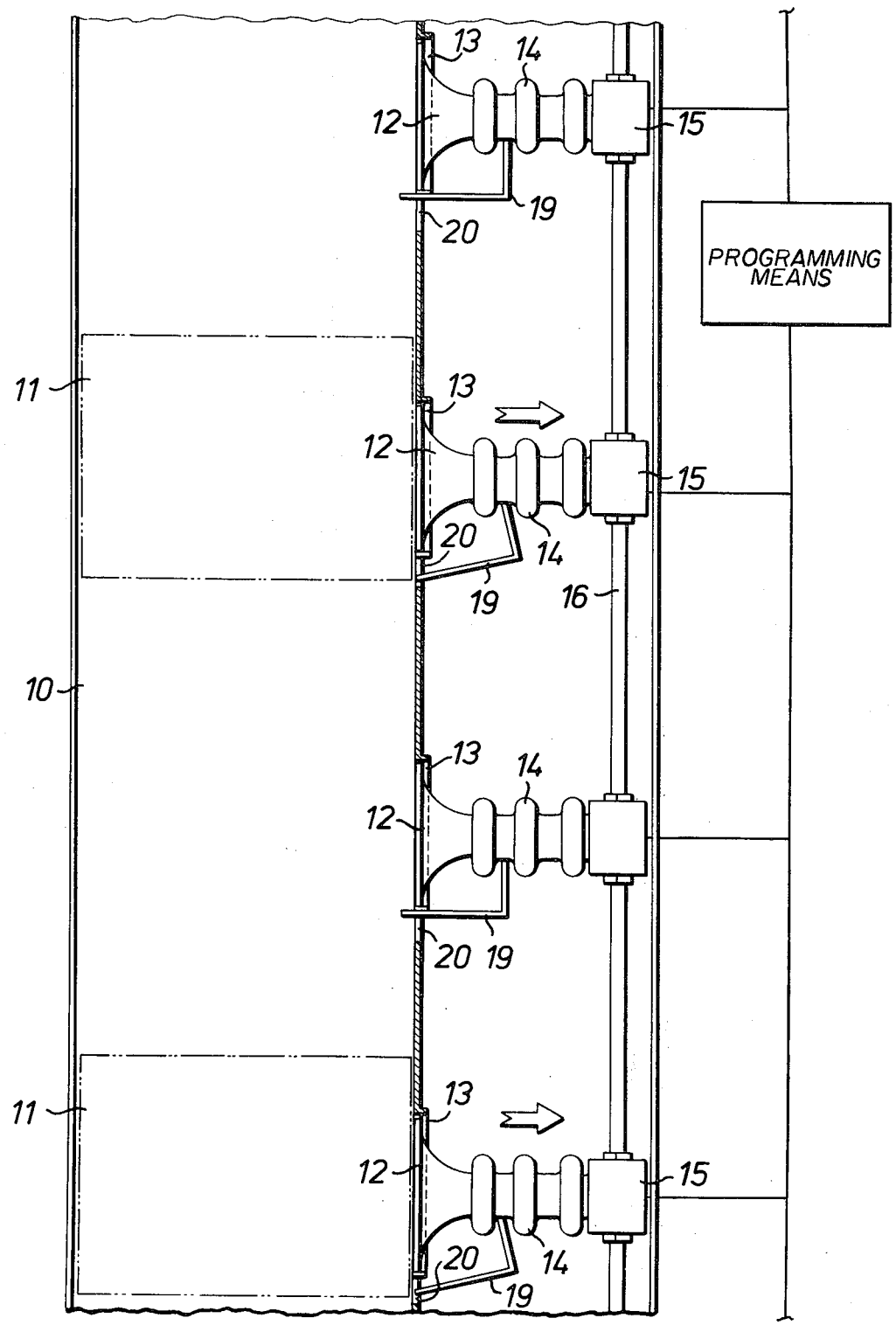

United States Patent [19]

Ishammar

[11] 3,987,933
[45] Oct. 26, 1976

[54] MAGAZINE FOR WARES FOR USE IN AUTOMATIC SHOPS

[76] Inventor: Nils Gosta Sigvard Ishammar, Manstigen 5, S-216 18 Malmo, Sweden

[22] Filed: Feb. 19, 1975

[21] Appl. No.: 551,192

[52] U.S. Cl. .............................. 221/298; 221/278; 193/32; 248/363
[51] Int. Cl.² ...................................... G07F 11/16
[58] Field of Search ........... 221/211, 212, 210, 278, 221/298; 222/335; 302/1; 193/32, 40; 248/363, 362, 206 R

[56] References Cited
UNITED STATES PATENTS

| | | | |
|---|---|---|---|
| 3,076,566 | 2/1963 | Dennis | 221/211 |
| 3,503,537 | 3/1970 | Masai et al. | 221/278 |
| 3,602,543 | 8/1971 | Sjodin | 248/363 |
| 3,603,646 | 9/1971 | Leoff | 193/32 |

FOREIGN PATENTS OR APPLICATIONS

| | | | |
|---|---|---|---|
| 1,052,898 | 3/1959 | Germany | 193/40 |

*Primary Examiner*—Robert B. Reeves
*Assistant Examiner*—H. Grant Skaggs
*Attorney, Agent, or Firm*—Ladas, Parry, Von Gehr, Goldsmith & Deschamps

[57] ABSTRACT

This invention relates to a magazine for wares for use in automatic shops, comprising a shaft for receiving a pile of packages, wherein there are distributed along the shaft a number of suction cups for retaining the packages individually in the shaft without the packages being in contact with each other, and wherein the suction cups are individually controllable in order to be made inoperative temporarily during a short interval one at a time in a sequence beginning from below and continuing upwards.

5 Claims, 4 Drawing Figures

MAGAZINE FOR WARES FOR USE IN AUTOMATIC SHOPS

Future retail sales of food stuffs and other necessities of life will most probably take place in automatic shops, where the customers will feed their orders to a selector of wares of some kind and will then have the ordered wares delivered at an outlet to which the wares are conveyed from a central store in the automatic shop through automatic means controlled by the selector. In order that the storage of the wares in the store as well as the automatic distribution of the wares from the store to the outlet may take place in a rational manner when an order is received it is necessary not only to have all goods in packages having the same volume and shape but also to keep these packages in magazines in the store from which they can easily be dispensed by means of mechanical dispensing members controlled from the selector of goods. The most simple solution is to keep the packages in piles and to move the packages out one at a time from the lower end of the piles, accordingly as the orders are received. This may easily be done by means of pneumatic cylinders but as the full weight of the pile will rest on the lowermost package in the pile, the said pile can only be of limited height in order to ensure that the withdrawal of the packages will take place in a reliable manner and without damaging the packages.

The invention aims at removing this drawback. This is achieved according to the invention by providing a magazine for wares in accordance with claim 1.

Figure 2:
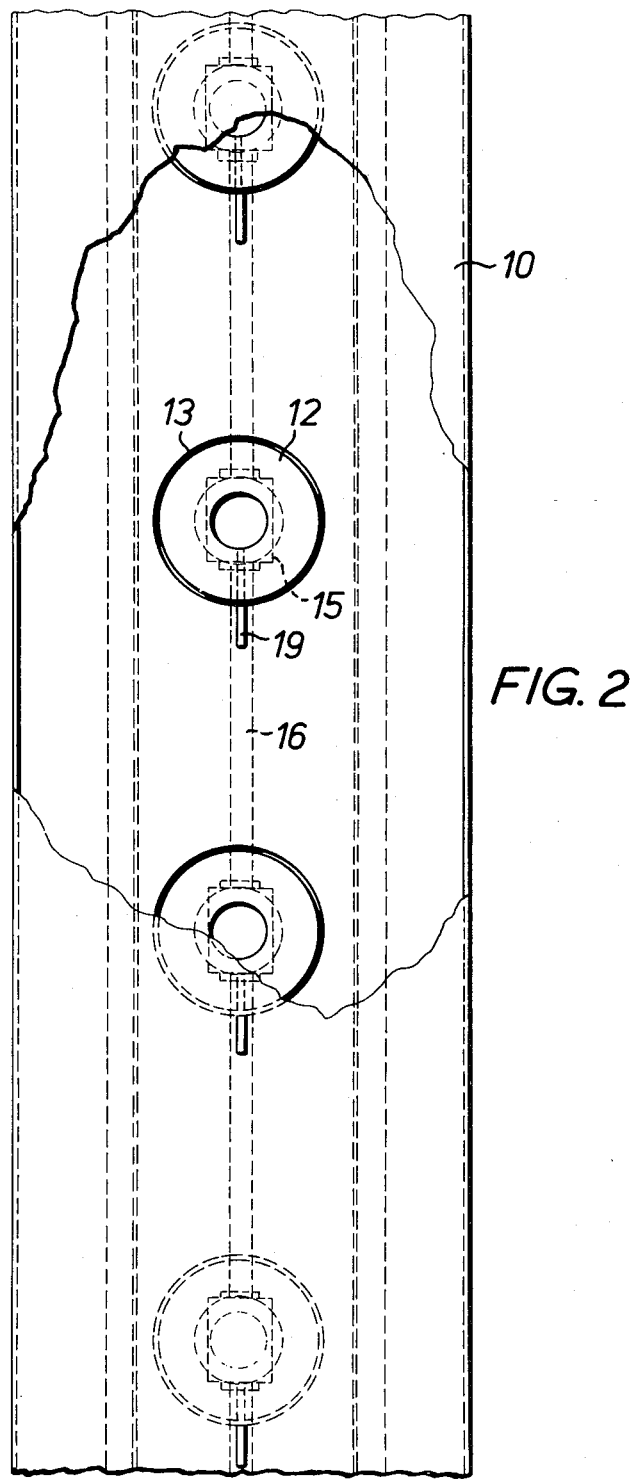
Figure 3:
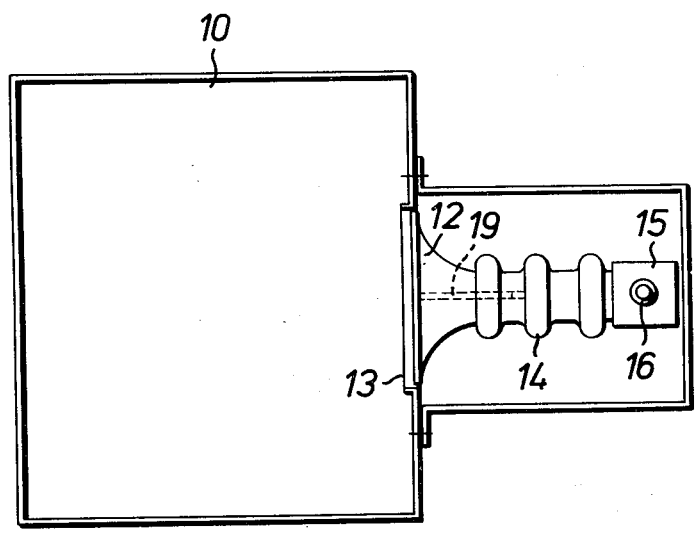
Figure 4:
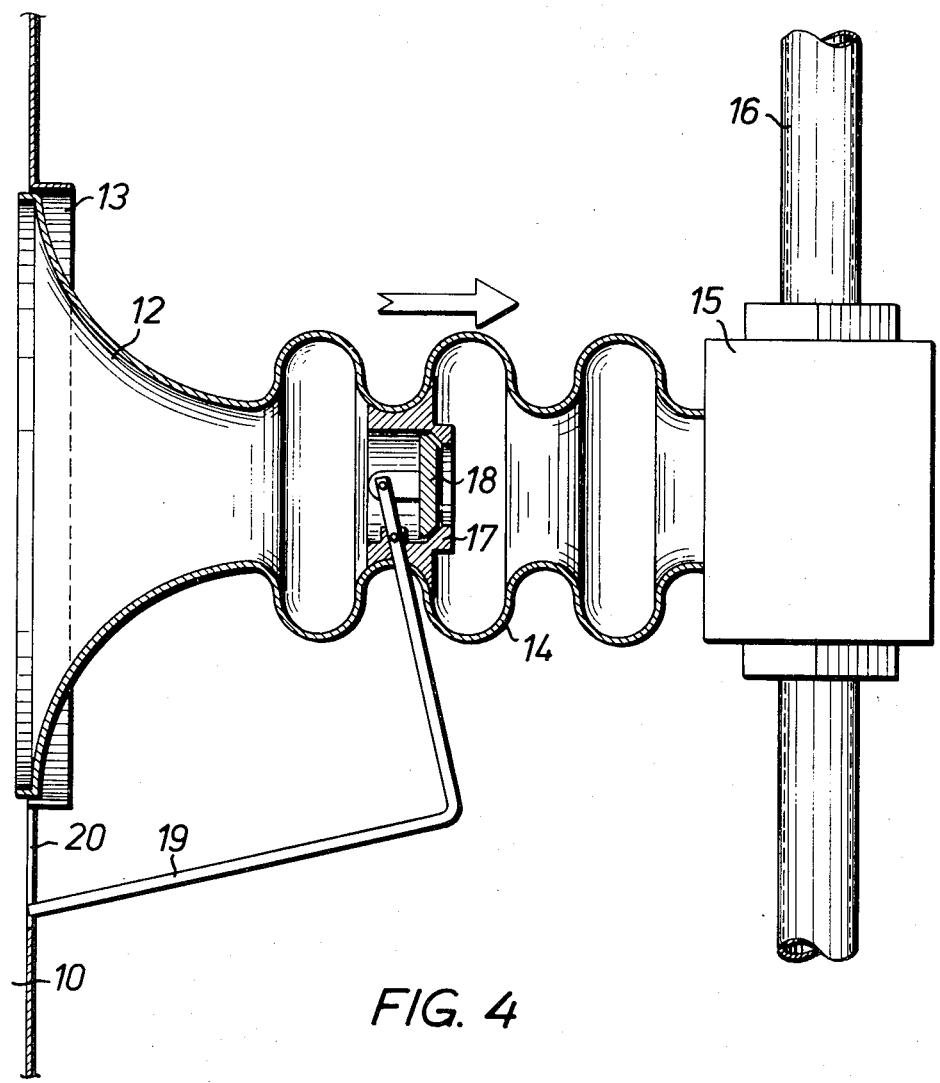

In order to elucidate it further the invention will be described in the following with reference to the accompanying drawings, in which FIG. 1 is a vertical sectional view of a portion of a magazine for wares in accordance with the invention, FIG. 2 is a side view, with portions partly broken away of the magazine according to FIG. 1, FIG. 3 is a cross-sectional view of the magazine shown in FIG. 1, and FIG. 4 is a detail view, partly a side view and partly in vertical section, on a larger scale of an individual suction member in the magazine according to the invention.

The magazine shown in the drawings comprises a vertical shaft 10 of rectangular cross section which fits parallel-epipedic packages 11 to be received in the magazine and permits the packages to slide easily down through the shaft 10 of their own weight. Along the shaft there are distributed a number of suction cups 12 which are disposed with their orifices in an opening 13 in a side wall of the shaft 10 and are located at a relative distance from each other which is at least equal to the height of the package 11. Each suction cup 12 is formed by one end portion of a tubular rubber bellows 14, the other end of which is connected to a solenoid valve 15 which is connected with a main line 16 in which there is maintained a certain pressure below atmospheric. Inside the rubber bellows there is a valve seat 17 having a disc valve body 18 for controlling the connection between the two ends of the rubber bellows 14, and to the disc valve body 18 there is connected an operating lever 19 bent at right angles and insertable with its free end into the shaft 10 through the slot 20 in the said side wall of the shaft 10 immediately below the opening 13 for the pertaining suction cup 14. The solenoid valves 15 are connected to a programming means for closing the solenoid valves 15 one after the other from below and upwards, so that the solenoid valves 15 will be closed one at a time during a short interval beginning with the lowermost solenoid valve 15 in the shaft 10. Normally, however, all solenoid valves 15 are kept open.

As long as the suction cup 12 is open inwardly towards the shaft 10 and the main line 16 is kept under a pressure below atmospheric with the solenoid valve 15 open, the disc valve member 17, 18 will be actuated to a closed position, due to the pressure difference existing above it, the lever 19 being kept held in such a position that its end will enter the shaft 10 through the slot 20. If a package is allowed to fall down into the shaft from the top it will, when positioned approximately opposite a suction cup 12, whose operating member 19 projects into the shaft 10 in the manner described, actuate the operating lever by moving it aside, in which connection the valve 17, 18 is opened and the suction cup 12 is immediately placed under a pressure below atmospheric and attracts the package 11, which will consequently be stopped in its falling motion through the shaft 10 and will be fixed in a position essentially opposite the suction cup 12. If the pertaining solenoid valve 15 is closed, the pressure below atmospheric in the suction cup 12 ceases to exist so that the cup will release the previously retained package 11, which will then continue its falling motion down through the shaft 10. When the solenoid valve 15 is opened once again the disc valve member 17, 18 will be pulled to a shut position as a consequence of the pressure difference above it so that the operating lever 19 is caused once again to enter the shaft 10, and the suction cup 12 is then ready to catch a new package 11 passing it.

The idea is to keep the shaft 10 filled with packages 11 each of which is kept in an individual position by one suction cup 12, as a consequence of which there may consequently be an interspace of a desired size between the packages 11, none of which will rest on another package. The shaft 10 may have any height and may contain any number of packages 11. The lowermost package 11 in the pile may rest on a support and, irrespectively of the packages 11 located above it may be easily moved out from the shaft 10 onto a conveyor or another member to be carried on by the said member to the outlet for wares by being moved out of the shaft 10 through a lateral opening by means of a pneumatic cylinder or the like. After the lowermost package 11 in the shaft 10 has been moved aside and the feed-out member has returned, the programming means is actuated. This may take place automatically in dependence on the function of the feed-out member in order to run through a cycle of operations during which the solenoid valves 15 will be closed one at a time during a short interval, beginning from below an continuing upwardly, in order that the pertaining suction cup 12 may be made inoperative during the said interval. Only one suction cup 12 at a time is made inoperative and, as mentioned, the sequence is from below and upwards. This means that after the lowermost package 11 has been fed out the package 11 which is located at the bottom is released and allowed to fall down to the feed-out position, the package only falling a short distance. When the suction cup 12 which has retained the said package 11 has been kept inoperative during a short interval in order to release its package, by closing the pertaining solenoid valve 15 by the programming means, the solenoid valve 15 is opened again, the disc valve member 17, 18 being moved to a closed position and its operating member 19 being once more inserted into the shaft 10. The suction cup 12 which is located immediately above is now made inoperative in the same manner, i.e. by closing the solenoid valve 15, and will consequently release its package 11, which will fall down into the shaft 10 until it hits the operating member 19 of the suction cup 12 located below, said suction cup 12 becoming immediately operative as a result of its disc valve member 17, 18 being opened and attracting the package 11, which is stopped in its fall and is then retained in the said position in the shaft 10. The same cycle of operations is now repeated one after the other for each of the suction cups 12 so that the packages 11 in the shaft 10 will be moved one at a time one step downward. Each package 11 consequently only has to fall under its own weight through the distance corresponding to the distance between two adjacent suction cups 12, and it is never loaded down by one of the other packages 11 but is always alone, both when it is moving in the shaft 10 and when it has been caught by one of the suction cups 12. As a result of this the lowermost package 11 in the shaft 10, the package which is in its feed-out position, may easily be manipulated at the withdrawal, and there is no risk that one package 11 will be crushed or pressed so as to break when it is located in the magazine or when it is fed out therefrom.

What I claim is:

1. A magazine for wares for use in automatic shops, comprising a shaft for receiving a pile of packages, wherein there are distributed along the shaft a plurality of suction means for retaining the packages individually in the shaft without the packages being in contact with each other, said suction means being individually controllable in order to be made inoperative temporarily during a short interval one at a time in sequence beginning from below and continuing upwards, said suction means being connected to a suction line, via a solenoid valve, said solenoid valves being connected to a programming means in order to be closed, resulting in making the suction means inoperative in the indicated sequence, and each said suction means being provided with a sensing member entering the shaft in order to make the suction means operative as a result of a package hitting the sensing member when the package is located opposite the pertinent suction member.

2. A magazine as claimed in claim 1, wherein each said suction member contains a valve which can be opened as a result of a package hitting the sensing member, in order to make the suction member operative when the solenoid valve is in an open position.

3. A magazine as claimed in claim 2, wherein each said suction means includes a bellows, one end of which is shaped as a suction cup opening into the shaft and the other end of which is connected to the suction line via the solenoid valve.

4. A magazine as claimed in claim 3, wherein disposed in the bellows between its ends is a disc valve controllable by said sensing member and being operable to a closed position as a result of a pressure difference between the bellows ends when the solenoid valve is open.

5. A magazine as claimed in claim 4, wherein said disc valve is resettable to an open position by actuation of the sensing member.

* * * * *